(12) United States Patent
Shigeta

(10) Patent No.: US 7,069,851 B2
(45) Date of Patent: Jul. 4, 2006

(54) GRAVURE PRINTING METHOD AND GRAVURE PRINTED ITEM

(75) Inventor: Kaku Shigeta, Chiba-ken (JP)

(73) Assignee: Think Laboratory Co., Ltd., Chiba-ken (JP)

( * ) Notice: Subject to any disclaimer, the term of this patent is extended or adjusted under 35 U.S.C. 154(b) by 0 days.

(21) Appl. No.: 10/759,420

(22) Filed: Jan. 20, 2004

(65) Prior Publication Data

US 2005/0155502 A1 Jul. 21, 2005

(51) Int. Cl.
*B41M 1/10* (2006.01)
*B41F 5/00* (2006.01)

(52) U.S. Cl. .................. 101/170; 101/216; 347/106

(58) Field of Classification Search ............... 101/170, 101/217; 347/106
See application file for complete search history.

(56) References Cited

U.S. PATENT DOCUMENTS

| | | | | |
|---|---|---|---|---|
| 2,338,558 A * | 1/1944 | Wickwire, Jr. | ............... | 427/286 |
| 5,205,212 A * | 4/1993 | Wolfe | .......................... | 101/170 |
| 5,396,839 A * | 3/1995 | Rice | ........................... | 101/32 |
| 5,766,807 A * | 6/1998 | Delabastita et al. | ........... | 430/6 |
| 5,778,793 A * | 7/1998 | Mello et al. | ................. | 101/494 |
| 6,055,907 A * | 5/2000 | Endisch et al. | .............. | 101/484 |
| 6,098,546 A * | 8/2000 | Schell | ........................ | 101/492 |
| 6,153,074 A * | 11/2000 | Hiraki et al. | ................ | 204/471 |
| 6,354,701 B1 * | 3/2002 | Korem | ........................ | 347/106 |
| 6,690,837 B1 * | 2/2004 | Broddin et al. | ............. | 382/254 |
| 2001/0030769 A1 | 10/2001 | Jacobs | | |
| 2003/0038976 A1 * | 2/2003 | Masotti | ...................... | 358/3.12 |
| 2004/0130753 A1 * | 7/2004 | Crounse | .................... | 358/3.12 |

FOREIGN PATENT DOCUMENTS

| | | | |
|---|---|---|---|
| EP | 0 740 457 A1 | | 10/1996 |
| EP | 0 817 468 A1 | | 1/1998 |
| JP | 2004066614 A | * | 3/2004 |
| JP | 2004066673 A | * | 3/2004 |
| JP | 2004262036 A | * | 9/2004 |

OTHER PUBLICATIONS

AGFA White Paper, "XM (Cross Modulated) Screening Technology", Doc. No.: XP-002287461, Retrieved from the Internet URL:http://graphics.agfa.com/downloads/white_papers, Aug. 25, 2003.
AGFA White Paper, p. 4 "Hybrid Screening Technology" & Print on Demand "White Paper on Agfa's Sublima Screening Available", Retrieved from the Internet URL:http://www.printondemand.com/MT/archives/001001.html, Aug. 25, 2003.
European Search Report, Jul. 27, 2004.

* cited by examiner

*Primary Examiner*—Andrew H. Hirshfeld
*Assistant Examiner*—Marvin P. Crenshaw
(74) *Attorney, Agent, or Firm*—Rader, Fishman & Grauer PLLC

(57) ABSTRACT

This invention provides a gravure printing method and a gravure printed item under application of cells of AM screen and cells of FM screen. The cells corresponding to the letters and the lettering images requiring a dark ink concentration and the like are formed by the AM screen and the cells corresponding to the photographic image and some fine lines expressed by the gradation are formed by the AM screen.

2 Claims, 3 Drawing Sheets

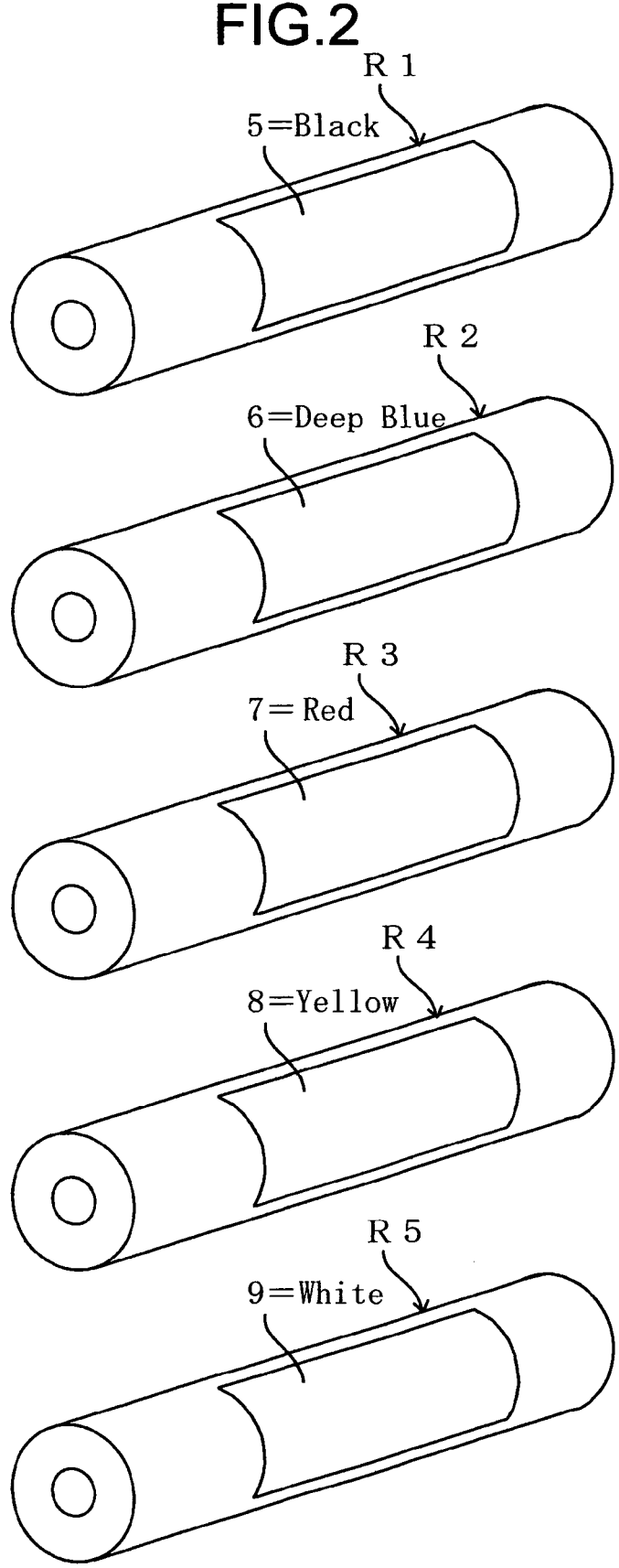

GRAVURE PRINTING METHOD AND GRAVURE PRINTED ITEM

DETAILED DESCRIPTION OF INVENTION

1. Technical Field of the Invention

This invention relates to a gravure printing method for overlay printing of a plurality of colors under application of a plurality of printing rolls, wherein there are provided a gravure printing method and a gravure printed item suitable for a printing having a printed portion requiring a dark ink concentration as well as a printed portion requiring a more precise gradation under application of an AM screen (Amplitude Modulation Screen) and a FM screen (Frequency Modulation Screen) improved for the gravure printing.

2. Related Art

FIG. 3 shows an AM screen for a normal gravure printing plate. In the case of the gravure printing plate, an expression of gradation is expressed with a size of dot, ink is put into cells through a doctor blade and surplus ink is required to be scraped off, so that an area of screen lines at the most dark shadow segment becomes 20% to 30%. That is, in the case of the gravure printing plate, this is constituted as a printing plate in which a gradation of the printing plate can be expressed by about 0 to 75% in respect to a gradation of the printed item by 0 to 100%.

In the case of a major gravure printing plate, there are provided one method for forming cells by an engrave forming process and the other method for forming cells through a photosensitive film coating, exposure, development and etching (hereinafter called as an etching process), wherein the method for forming the cells through the engrave forming process is superior in transfer of ink through a highlight portion because the cells are formed in a quadrangular pyramid. The etching process has a defect that a transfer of ink is more inferior to that of the engrave process due to a clogging of the ink in the cells at the highlight portion having quite small cells because the cells are formed at a shallow pan-like notch portion, and in turn this process has a merit that a crossing portion of screen lines at the most dark shadow portion is recessed to cause the ink to flow there and enable the ink to be positively transferred to the crossing portion and at the same time a contour of the letter to have a smooth outline having no fringes. In addition, the etching process is suitable for a printing operation in which water-based ink is used because the cells at the most dark shadow portion are shallow in their form.

FIG. 5 shows an AM screen for an offset printing plate or a flexographic printing plate. Although the AM screen such as an off-set printing plate or the like also expresses an expression of gradation through a size of dots, a screen fabric is not required while being different from the gravure printing plate, so that the gradation of the plate substantially accurately corresponds to the gradation of the printed item by 0 to 100%.

In recent years, in the field of either an offset printing or a flexographic printing, the FM screen type printing in which the gradation expression is expressed by the number of some fine dots has been started to be practically applied mainly in European countries or US as shown in FIG. 6 in place of the prior art AM screen method shown in FIG. 5. In the case of the FM screen technology, although improvement of image quality is also expected at an output from either a printer or an on-demand printing machine that is an output machine of low resolution because of a resolution of minimum drawing dot where a fine structural expressing capability is used, in the case of the gravure printing, any trial for applying it has not been carried out because ink is put into the cells by a doctor blade and there is not provided a screen line for scarping off surplus ink.

The FM screen system applied to the field of either the offset printing or the flexographic printing will be extracted as follows in reference to some merits published on the Internet system by The Japan Federation of Printing Industries.

(1) The FM screen can avoid an occurrence of moire becoming a hindrance because the dot shapes are not regularly arranged like a screen (FIG. 6). In the case of the AM screen, it has been set such that a screen angle is set at each of the printing plates to cause an output moire to become minimum. To the contrary, in the case of FM screen, no output moire is generated because several dots are present to be dispersed. In the case of the FM screen, no Rosette pattern is produced. In the case of the AM screen, a pattern of hexagonal shape appears over a range from the highlight to halftone. However, in the case of the FM screen, this pattern of hexagonal shape does not appear. Even in the case of printing five colors or more, no line cutting appears.

(2) In the case of the FM screen, a printing of high resolution can be realized because a dot size can be made small over a full tone ranging from the highlight to the shadow. This FM screen shows that minimum size dots are distributed in such a way that they do not adhere to each other up to an area of approximately 30% concentration.

(3) In the case of the FM screen, a density jump does not expressively appear. The density jump (a stepped concentration) generated at dots near 50% in the case of the AM screen does not expressively appear at the FM screen. A reason why this state occurs consists in the fact that the contacted state between the adjoining dots near the middle region becomes random and the density jump becomes less in its volume.

(4) FM screen enables a clear color tone to be expressed. FM screen enables both colors near the primary colors and colors showing a high chroma to be realized with four process colors and further enables a more realistic effect of expression to be realized.

(5) In the case that the same output data capacity is present, the FM screen enables a higher resolution than that of the AM screen to be realized. Since a space between the dots in the FM screen can be made small, if the output data capacity in the FM screen is the same as that of the AM screen, reduction in size of dot diameter in the FM screen enables a higher resolution to be realized than that of AM screen. Since a minimum drawing dot in the FM screen becomes a physical resolution, it can be expected that a less amount of image data (by 32 to 51% of the screen) than that of AM screen can constitute the screen. Since the dot diameter can be made large for attaining the same resolution as that of the AM screen, 175 lines, it is satisfactory that the FM screen composed of the same input capacity can be constituted by a relative low image data capacity. Due to this fact, if quality corresponding to 175 lines in the screen could be realized in the FM screen of large dot diameter, reduction in a processing time or a waiting time at the plate making step and output step as well as improvement of productivity might also have been expected.

(6) A minimum drawing dot in the FM screen becomes a physical resolution and so a higher resolution than that found at the AM screen may easily be attained. Although number of gradations in the AM screen is decreased under the large number of screen lines because a high precise or fine state is realized, the FM screen does not produce such a decreased number of gradations.

(7) The FM printed item increases a tone ranging from a halftone to a shadow portion more as compared with that of the AM printed item and its tone ranging from the highlight to the halftone is outputted to a substantial same degree as that of the AM printed item to a lower value. K-number in the FM screen expressing a contrast at the shadow part is entirely low. A high ink solid concentration in the FM screen applied for a high precise printing operation using a small dot diameter is hardly attained at the dot portion in the same manner as that of the AM screen having a large number of screen lines.

All the prior art gravure printing rolls are formed with the cells in the AM screen, there are not provided any gravure printing rolls formed by the cells of the FM screen. Although the engraving process cannot perform an engraving of the FM screen, a photolithography process has a capability of attaining the FM screen.

In addition, there was not provided such a prior art gravure printing roll as one in which the cells of the AM screen and the cells of the FM screen are formed against one roll.

In the specification of the present invention, the cell in the AM screen is defined as one cell manufactured by a laser plate making composed of the steps of coating a photosensitive film—laser exposure and forming a latent image—development—etching, keeping a specified arrangement pitch and having a size of the cell changed, and the other cell manufactured by a diamond stylus of an electronic engraver, keeping a specified arrangement pitch and having both a size and a depth of the cell changed and another cell keeping its arrangement pitch constant.

In the case of the prior art, as a gravure printing plate manufacturing operation requiring an acute contour of a letter or a gravure printing plate manufacturing operation requiring a sufficient concentration at a shadow part, a laser printing plate made by some steps of coating a photosensitive film—exposing with laser and forming a latent image with laser—developing—etching was frequently utilized, and as an image having a large amount of photographic portions, a gravure printing plate manufacturing operation with an electronic engraver showing a less amount of poor transfer caused by knockout of ink was frequently utilized.

In addition, when the multi-color gravure printing plate was to be manufactured, there was frequently found that a letter and fine line printing plate was processed in a halftone gravure printing plate and a printing plate having a photograph was processed in an engraver, respectively.

However, when the engraving printing plate and the halftone gravure printing plate were accidentally combined to each other, there occurred a certain image generating a moire and so its usage had a certain restriction. Additionally, both printing plate-manufacturing systems were utilized for one cylinder to enable the photograph portion to be manufactured by the electronic engraver and a letter and fine line portion to be manufactured by a halftone gravure printing machine, for example, although the number of steps in manufacturing was increased because the gravure printing plate machine was widely utilized and it had a problem of high cost when it was practically applied.

SUMMARY OF INVENTION

The present invention has been invented in view of the foregoing problems, wherein it is an object of the present invention to provide a gravure printing roll and a gravure printed item in which a more precise gravure printing as compared with that printed by the gravure-printing roll having the cell of the prior art AM screen can be attained by enabling the FM screen capable of being applied to the offset printing and the like to be applied to the gravure printing operation, combining the FM screen with the AM screen so as to accommodate for their disadvantages.

It is an object of the present invention to provide a gravure printing roll and a gravure printed item in which a problem of poor concentration generated by arranging the FM screen can be avoided by setting the AM screen, and the problems of poor transfer of ink at the highlight portion or vague contour of slanted fine lines or curved lines and occurrence of moire can be avoided by arranging the FM screen.

It is another object of the present invention to provide a gravure printing method and a gravure printed item in which a plurality of kinds of colors are overprinted under application of a plurality of printing rolls and the present invention is suitable for a printing having one printing portion requiring a dark ink concentration and the other printing portion requiring a high precise gradation under application of the AM screen and the FM screen improved for the gravure printing.

The invention defined in Claim 1 can provide a gravure printing method in which a plurality of colors are printed to be overlapped under an application of a plurality of printing rolls characterized in that in at least any one of the rolls, cells corresponding to letters or lettering images or the like requiring a dark ink concentration are formed by an AM screen, cells corresponding to photographic images expressed by a gradation or some fine lines are formed by a FM screen ranging from a highlight portion to a shadow portion, or formed in such a way that the portion ranging from the highlight portion to the halftone portion is the FM screen, the grid-shaped AM screen is gradually mixed from the halftone portion and the AM screen is completely formed at a region of the shadow portion.

The invention defined in Claim 2 can provide a gravure printing method in which a plurality of colors are printed to be overlapped under an application of a plurality of printing rolls characterized in that in a printing roll for performing a printing operation requiring a dark ink concentration, the cells are formed by the AM screen, in a printing roll for performing a printing operation of photographic images expressed by gradation and some fine lines, the cells of the FM screen are formed ranging from the highlight portion to the shadow portion, or the cells of the FM screen are formed ranging from the highlight portion to the halftone portion and the grid-shaped AM screen is gradually mixed from the halftone portion and the AM screen is completely applied at the region of the shadow portion.

The invention defined in Claim 3 can provide a gravure printed item characterized in that the same is printed by the gravure printing method according to Claim 1 or Claim 2.

The invention defined in Claim 1 can provide a gravure printing roll and a gravure printed item by a gravure printing method in which a plurality of colors are overlapped to print under an application of a plurality of printing rolls, wherein as at least one roll, a printing roll is used in which cells corresponding to letters or lettering images or the like requiring a dark ink concentration are formed by an AM screen to assure a requisite and sufficient dark ink concentration, and cells corresponding to photographic images or some fine lines expressed by a gradation are formed by a FM screen, thereby as a merit in which the FM screen is more superior than the AM screen, there are provided the facts that occurrence of moire can be avoided, no line cutting is generated even under printing of five colors or more, a printing of high resolution can be realized again and a density jump is not clearly expressed and the like.

The invention defined in Claim 2 can provide a gravure printing method and a gravure printed item by a gravure printing method in which a plurality of colors are overlapped to print under an application of a plurality of printing rolls, wherein as a printing for printing either black or white color, a constitution of the cells in the gravure printing roll for performing the printing is formed to attain the dark ink concentration, as to the printing of dark blue, red and yellow or the like, a printing of gradation in which a constitution of the cells of the gravure printing roll to perform the printing is highly precise, even if an overlapping printing is carried out, a printing hardly producing moire can be carried out, and a more precise gravure printing as compared with that of printing performed by the gravure printing roll having cells of the prior art AM screen. In addition, the invention defined in Claim 2 can provide a gravure printing method and a gravure printed item in which as to a problem of poor concentration generated at the time of FM screen, it can be avoided by setting the AM screen, and as to some problems such as poor transfer of ink at the highlight portion generated under the AM screen or a vague contour of the slanted fine lines or curved lines and occurrence of moire, they can be avoided by setting the FM screen and the merits of the aforesaid FM screen can be attained.

BRIEF DESCRIPTION OF THE DRAWINGS

FIG. 2 is an illustrative view for showing the preferred embodiment of the invention defined in Claim 2, wherein it shows a gravure printing method in the case that five colors of black, dark blue, red, yellow and white are overlapped to each other under application of five printing rolls.

FIG. 5 is a view for showing a normal AM screen used in the prior art offset printing and the like.

FIG. 6 is a view for showing a FM screen used in the prior art offset printing and the like.

PREFERRED EMBODIMENTS OF INVENTION

As the present invention providing a gravure printing method for over-printing a plurality of colors under an application of a plurality of printing rolls, there is provided one preferred embodiment in which the AM screen and the FM screen are present in a mixed state in at least one roll and the other rolls are formed with any one of the AM screen and the FM screen and there is provided another preferred embodiment in which the AM screen and the FM screen are not present in a mixed state at any one of the rolls, but rolls having the AM screen formed therein and the other rolls having the FM screen formed therein are present in a mixed state.

The former preferred embodiment uses a printing roll as at least one roll constructed such that the cells corresponding to letters requiring a dark ink concentration and lettering images and the like are formed by the AM screen, and the cells corresponding to photographic images expressed by a gradation and some fine lines are formed by the FM screen ranging from the highlight portion to the shadow portion, or formed by the FM screen ranging from the highlight portion to the halftone portion, the grid-shaped AM screen being gradually mixed from the halftone portion and the complete AM screen being present at the region of the shadow portion.

In the case of the latter preferred embodiment, in a printing roll for performing a printing operation requiring a dark ink concentration, cells are formed by the AM screen, and in a printing roll for performing a printing of photographic image expressed by gradation and some fine lines, cells of the FM screen ranging from the highlight portion to the shadow portion are formed, or the cells of the FM screen ranging from the highlight portion to the halftone portion are formed and the grid-like AM screen is gradually mixed from the halftone portion and the AM screen is completely used in the region of the shadow portion.

[Embodiment 1]

Figure 1:
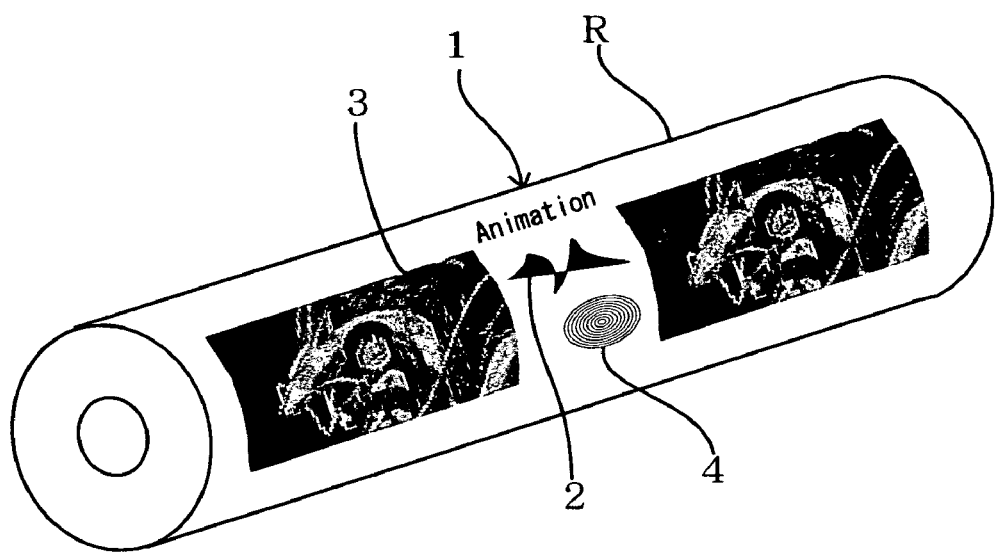
FIG. 1 is a perspective view for showing the gravure printing roll related to the preferred embodiment of the invention defined in Claim 1.
Figure 3:
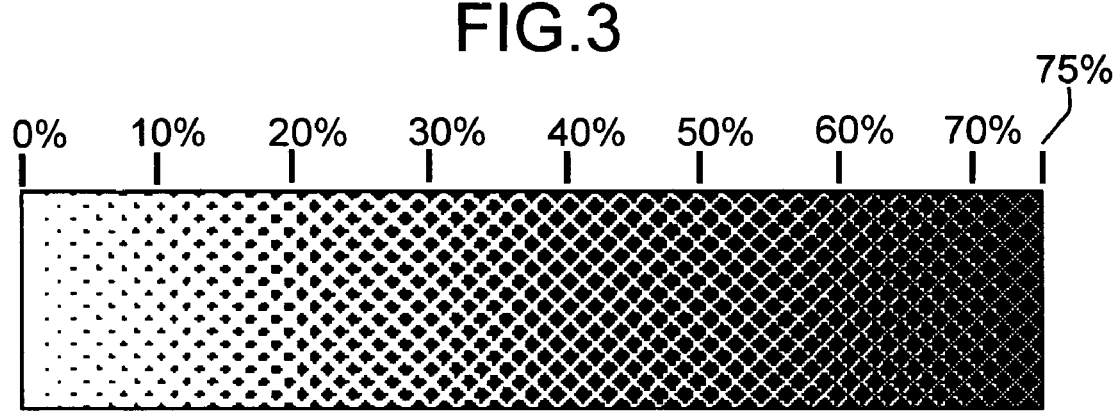
FIG. 3 is a view for showing a normal AM screen for a gravure printing plate used in the prior art and used in the present invention.
Figure 4:
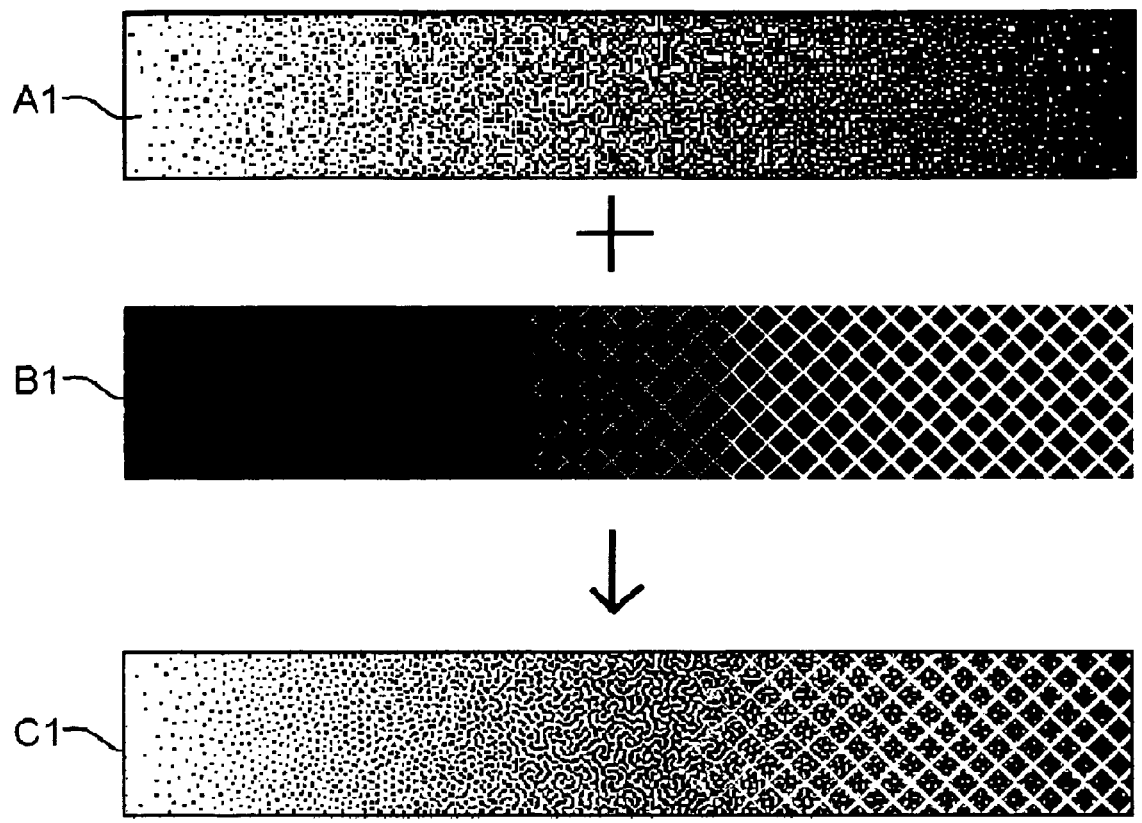
FIG. 4 is a view for showing a gradation of a FM screen used in the present invention.
Figure 5:
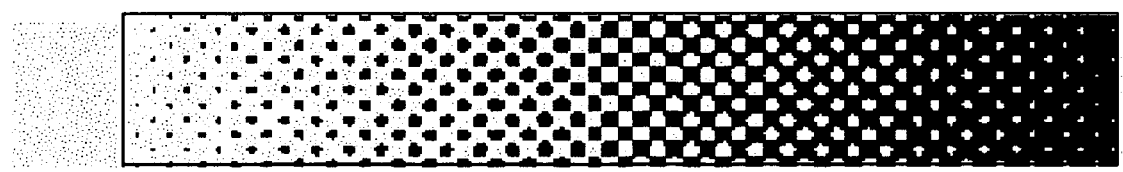

As shown in FIG. 1, cells corresponding to a letter 1 requiring a dark ink concentration and a lettering image 2 or the like are formed by the AM screen shown in FIG. 3 in respect to one roll R, and the cells corresponding to the photographic image 3 expressed by a gradation and some fine lines 4 are formed by the FM screen shown at C1 in FIG. 4.

[Embodiment 2]

As shown in FIG. 2, in the case of a gravure printing for overlapped printing of five colors of black, dark blue, red, yellow and white under application of five printing rolls, for example, a gravure printing method is carried out such that a gravure printing roll R1 is installed at a first printing station to print black color as shown in FIG. 2; a gravure printing roll R2 is installed at a second printing station to print dark blue color; a gravure printing roll R3 is installed at a third printing station to print red color; a gravure printing roll R4 is installed at a fourth printing station to print yellow color; and a gravure printing roll R5 is installed at a fifth printing station to print white color, respectively.

In the case of printing a black color and a white color, a dark ink concentration can be attained because a constitution of the cells forming either a printing image 5 or 9 of the gravure printing roll performing their printing is formed by the AM screen as shown in FIG. 3.

In addition, in the case of printing dark blue color, red color and yellow color, a high precision gradation printing can be carried out and even if the overlaying printing is performed, its printing can be performed in a less amount of moire because a constitution of the cells forming either the printing image 6, 7 or 8 of the gravure printing roll carrying out each of the printings is formed by the FM screen shown at C1 in FIG. 4.

Accordingly, the letters and lettering images requiring a dark ink concentration and the like are printed in black and white colors or although not shown, they are printed by a roll constituted by the cells of the AM screen while some features are arranged at the roll. In addition, in the case that both photographic images expressed by the gradation and some fine lines are printed in colors other than black and white colors, they are printed by the roll constituted by the cells of the FM screen.

The AM screen shown in FIG. 3 can be formed by any one of a cell forming method carried out by an electronic engraver and a cell forming method performed by a photosensitive film coating—exposure—development—etching.

In FIG. 4, A1 denotes digital information in the FM screen that can be attained by performing the FM screening through the FM screening program in the case that a gradation of 0 to 100% is prepared as printing plate information before forming the printing plate. B1 denotes an AM screen information displayed by the screen lines at the darkest shadow portion in the AM screen attained in correspondence with an area in the shadow portion or an area ranging from a part near the shadow portion at the halftone part to the shadow portion by AM screening printing plate information before forming the printing plate. C1 denotes digital printing plate information in which digital information of FM screen shown at A1 is overlapped with digital information of only the screen lines in the AM screen shown at B1.

Accordingly, the printing plate C1 becomes a gravure printing plate in which information B1 (shown as optical information) of only the screen lines at the darkest shadow portion in the AM screen in the gravure printing plate is overlapped on an area ranging from a part near the shadow portion of the halftone part to the shadow portion in the FM screen information A1 (shown as optical information) where the area ranging from the highlight portion to the shadow portion is FM screened in such a way that the minimum cell may have a desired size having an ink transfer carried out in a superior manner against printing plate information before forming the printing plate and formed, thereby the FM screen is accurately set at an area ranging from the highlight portion to the halftone portion, no rough state occurs at the FM screen, and further the minimum cell is restricted to such a desired size as one where an ink transfer is carried out in a superior manner, the grid-shaped AM screen is gradually generated from the halftone portion at the base of the FM screen, and the screen becomes completely an AM screen in the region of the shadow portion.

The FM screen shown at the printing plate C1 in FIG. 4 is formed by a forming method for forming cells through photosensitive film coating—laser exposure—development—etching or formed by a cell forming method through the laser engraving method.

Since the FM screen cannot be made by an electronic engraver, it is preferable that the printing plate having the AM screen and the FM screen mixed to each other is formed by any one of the cell forming method performed through a photosensitive film coating—laser exposure—development—etching or the cell forming method performed by the laser engraving method and the number of steps is reduced.

Figure 6:
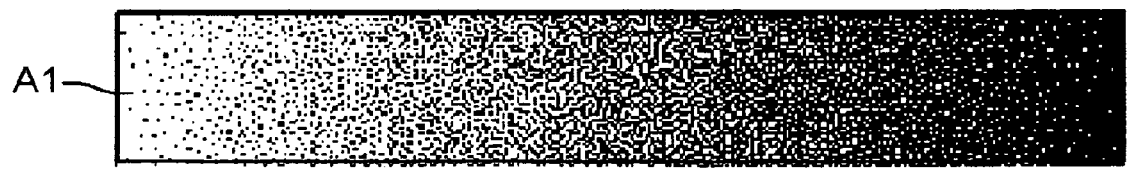

This gravure printing plate is the grid-shaped AM screen required for performing the gravure printing at the shadow portion, wherein the dots in the FM screen are present in the grids, the optical concentrations are eccentrically applied, a sufficient optical concentration can be attained at the printed item, the grid-shaped AM screen in an area ranging from the shadow part to the halftone part gradually diminishes and shifts to the dots in the FM screen, and the screen lines at the darkest shadow part in the AM screen in the gravure printing plate are not overlapped to each other in an area ranging from the halftone part to the highlight part, so that the screen is purely the FM screen and further a superior ink transfer can be attained and a superior point of the FM screen is established because the minimum cell is restricted in size to a desired size where the superior ink transfer is carried out well. Further, it may also be applicable that the FM screen having a concentration gradation region ranging from 0% to 100% shown in FIG. 6 is replaced with the FM screen shown in the printing plate C1 in FIG. 4 in which the gradation range is from about 75% to 100%.

A printing plate manufacturing method is carried out such that digital printing plate information is decomposed in chromatic manner into three colors of Y, M, C, a region ranging from the highlight portion to the shadow portion is processed in FM screening by an improved program where the minimum cell is restricted to a desired size showing the superior ink transfer carried out to attain printing plate information and at the same time the AM screening is carried out by the improved AM screening program to attain printing plate information displayed by the screen lines at the darkest shadow portion of the AM screen of the gravure printing plate from the halftone shadow portion to the shadow portion, both printing plate information are overlapped to each other and the printing plate is manufactured in response to printing plate information.

The invention claimed is:

1. A gravure printing method comprising
   printing a plurality of colors to be overlapped by an application of a plurality of printing rolls,
   wherein at least any one of the printing rolls comprises (a) cells corresponding to letters or lettering images requiring a dark ink concentration, and (b) cells corresponding to photographic images expressed by a gradation or some fine lines,
   wherein said cells of (a) are cells of an AM screen, the grid-shaped AM screen being gradually formed from the halftone portion, and the AM screen being completely formed at a region of a shadow portion,
   wherein said cells of (b) are cells of a FM screen ranging from a highlight portion to the shadow portion, or said portion ranging from the highlight portion to a halftone portion is the FM screen.

2. A gravure printing method comprising
   printing a plurality of colors to be overlapped by an application of a plurality of printing rolls,
   wherein said plurality of printing rolls comprises (a) a printing roll for performing a printing operation requiring a dark ink concentration, and (b) a printing roll for performing a printing operation of photographic images expressed by gradation and some fine lines,
   wherein said printing roll of (a) comprises cells of an AM screen, the grid-shaped AM screen being gradually applied from the halftone portion, and the AM screen being completely applied at the region of a shadow portion,
   wherein said printing roll of (b) comprises cells of a FM screen ranging from the highlight portion to the shadow portion, or ranging from the highlight portion to a halftone portion.

* * * * *